US007099113B2

(12) United States Patent
Lee et al.

(10) Patent No.: US 7,099,113 B2
(45) Date of Patent: Aug. 29, 2006

(54) DISC BRAKING DEVICE

(75) Inventors: In-Shuen Lee, Taipei (TW); Jui-Nan Chuang, Taipei (TW); Cheng-Chung Hsu, Taipei (TW)

(73) Assignee: Lite-On It Corporation, Taipei (TW)

( * ) Notice: Subject to any disclaimer, the term of this patent is extended or adjusted under 35 U.S.C. 154(b) by 201 days.

(21) Appl. No.: 10/709,446

(22) Filed: May 6, 2004

(65) Prior Publication Data

US 2004/0223415 A1    Nov. 11, 2004

(30) Foreign Application Priority Data

May 7, 2003    (TW)    ................ 92112383 A

(51) Int. Cl.
*G11B 23/03*    (2006.01)
(52) U.S. Cl. .................. 360/133; 369/268; 369/270.1; 369/271.1; 360/132
(58) Field of Classification Search ................ 720/602, 720/695, 696, 698, 700; 369/30.03, 183, 369/189, 231–241, 258.1, 264–268
See application file for complete search history.

(56) References Cited

U.S. PATENT DOCUMENTS

| 4,331,989 | A | * | 5/1982 | Viskochil | ................ | 360/99.08 |
| 4,497,002 | A | * | 1/1985 | von der Heide et al. | ... | 369/268 |
| 4,799,122 | A | * | 1/1989 | Tanaka et al. | .............. | 360/133 |
| 5,388,094 | A | * | 2/1995 | Park | ........................... | 720/710 |
| 5,883,870 | A | * | 3/1999 | Akiba et al. | ................. | 720/602 |
| 6,731,580 | B1 | * | 5/2004 | Sato et al. | ................... | 720/655 |
| 2002/0018426 | A1 | * | 2/2002 | Minase | ....................... | 369/75.2 |
| 2004/0223447 | A1 | * | 11/2004 | Tanaka et al. | .............. | 369/292 |

FOREIGN PATENT DOCUMENTS

| JP | 2004227714 A | * | 8/2004 |
| JP | 2005182905 A | * | 7/2005 |

* cited by examiner

*Primary Examiner*—Andrea Wellington
*Assistant Examiner*—Matthew Greco Kayris
(74) *Attorney, Agent, or Firm*—Winston Hsu

(57) ABSTRACT

A disc braking device is utilized in an optical disc drive. The disc braking device is installed on a disc tray of an optical disc drive. Without being affected by an covering component or the location of the disc braking device, the disc braking device makes a disc stop rotating in a more direct and efficient way. The disc braking device contains a structure portion; a braking rod installed and not fixed on the structure portion; and a braking component installed on the braking rod and utilized for making the disc stop rotating.

24 Claims, 20 Drawing Sheets

DISC BRAKING DEVICE

BACKGROUND OF INVENTION

1. Field of the Invention

The present invention relates to a disc braking device utilized for making a disc stop rotating, and more specifically, to a disc braking device utilized in a slim type optical disc drive.

2. Description of the Prior Art

Recently, computer peripheral products have improved while prices have decreased. Generally speaking, the prices of optical disc drives are acceptable for consumers. A slim type optical disc drive is a computer peripheral device for storing information in a notebook computer. Because the consumers use notebook computers more than before, the need of the global market for notebook computers is growing and the future market for notebook computers is expected to remain strong. Hence, the need for slim type optical disc drives is growing and expectable. The reading speed of optical disc drives is getting higher and the techniques relating to optical disc drives are improving.

Please refer to FIG. 1. FIG. 1 is a perspective view illustrating a slim type optical disc drive 1B having loaded a disc 9 according to the prior art. The disc 9 is positioned on a turn table 12 of a spindle motor of the slim type optical disc drive 1B according to the prior art. After loading the disc 9, the disc tray 10 slides into the slim type optical disc drive 1B. Afterwards, the disc 9 rotates at a high speed and the data stored on the disc 9 is optically read. Before the disc 9 is ejected from the slim type optical disc drive 1B according to the prior art, electric power that is supplied to the spindle motor for driving the turn table 12 is cut. However, inertia causes the turn table 12 to keep rotating. Therefore, to force the turn table 12 to stop rotating, a disc braking device 11 is designed and installed on the upper cover or the bottom cover of the slim type optical disc drive 1B according to the prior art. Before the disc 9 is loaded or ejected, the disc 9 touches the disc braking device 11 and is stopped from rotating. Please refer to FIG. 2. FIG. 2 is a perspective view illustrating the slim type optical disc drive 1B loading the disc 9 according to the prior art. When the slim type optical disc drive 1B is loading the disc 9, the disc 9 touches the disc braking device 11 installed on the bottom cover 13 and then stops rotating. Please refer to FIG. 3. FIG. 3 is a perspective view illustrating the slim type optical disc drive 1B after the disc 9 has been ejected according to the prior art. Before the disc 9 is ejected from the slim type optical disc drive 1B, the disc 9 touches the disc braking device 11 installed on the bottom cover 13 and then stops rotating. Therefore, it can be ensured that the disc 9 stops rotating before it is ejected from the slim type optical disc drive 1B. Afterwards, a user can immediately change the disc. A problem with the prior art is that the position of the disc braking device 11 is affected by the shape of the upper cover and the bottom cover 13 of the slim type optical disc drive 1B and the variations during manufacturing. Thus the disc braking device 11 may be disposed improperly and fail to function appropriately.

SUMMARY OF INVENTION

It is therefore an objective of the claimed invention to provide a disc braking device utilized in an optical disc drive to solve the above-mentioned problem. The disc braking device is installed on a disc tray of an optical disc drive. Without being affected by a covering component or the location of the disc braking device, the disc braking device can stop a disc from rotating in a more direct and efficient way. The disc braking device contains a structure portion; a braking rod installed and rotatable on the structure portion; and a braking component installed on the braking rod and utilized for making the disc stop rotating.

These and other objectives of the claimed invention will no doubt become obvious to those of ordinary skill in the art after reading the following detailed description of the preferred embodiment, which is illustrated in the various figures and drawings.

DETAILED DESCRIPTION

The following description of the embodiments according to the present invention is related to a slim type optical disc drive. However, the present invention can be utilized in all kinds of optical storage products, including CD-ROM drives, CD-RW drives, half height optical disc drives, COMBO drives, DVD-R/RW drives, external optical disc drives and all kinds of optical media recorders and players.

Figure 1:
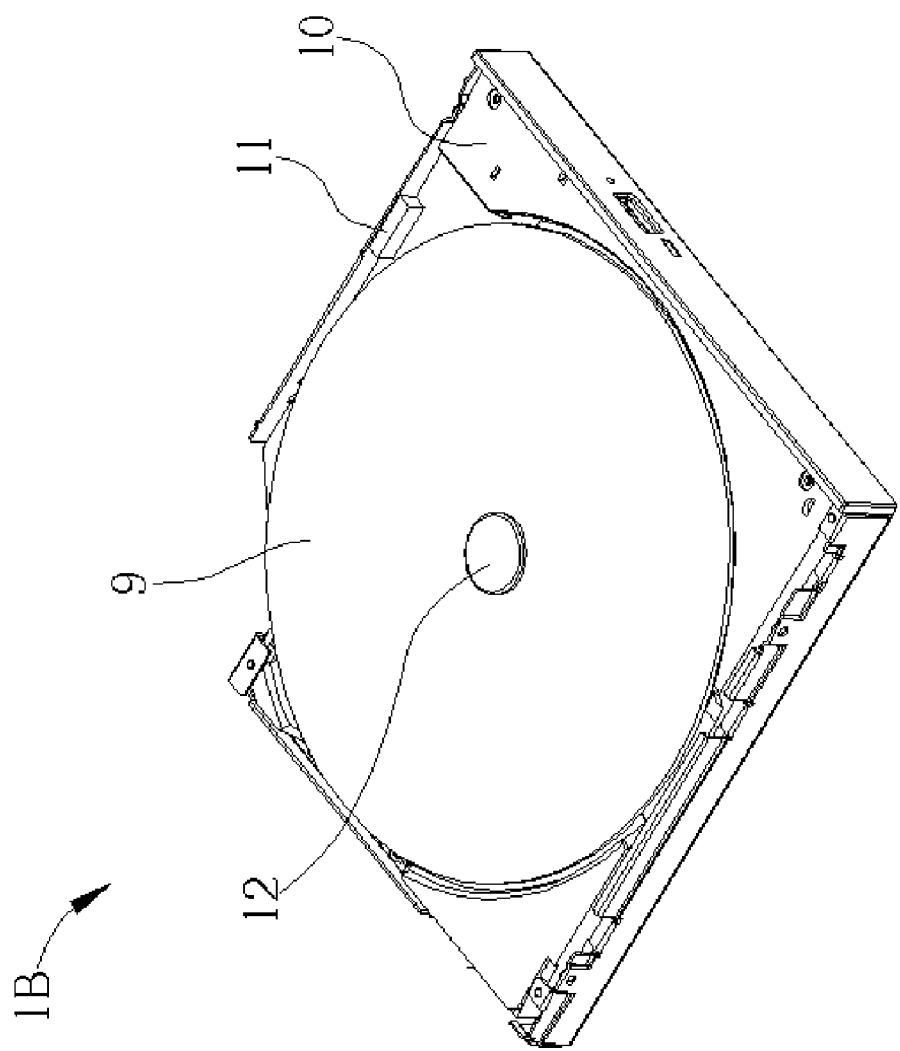
FIG. 1 is a perspective view illustrating a slim type optical disc drive having loaded a disc according to the prior art.
Figure 2:
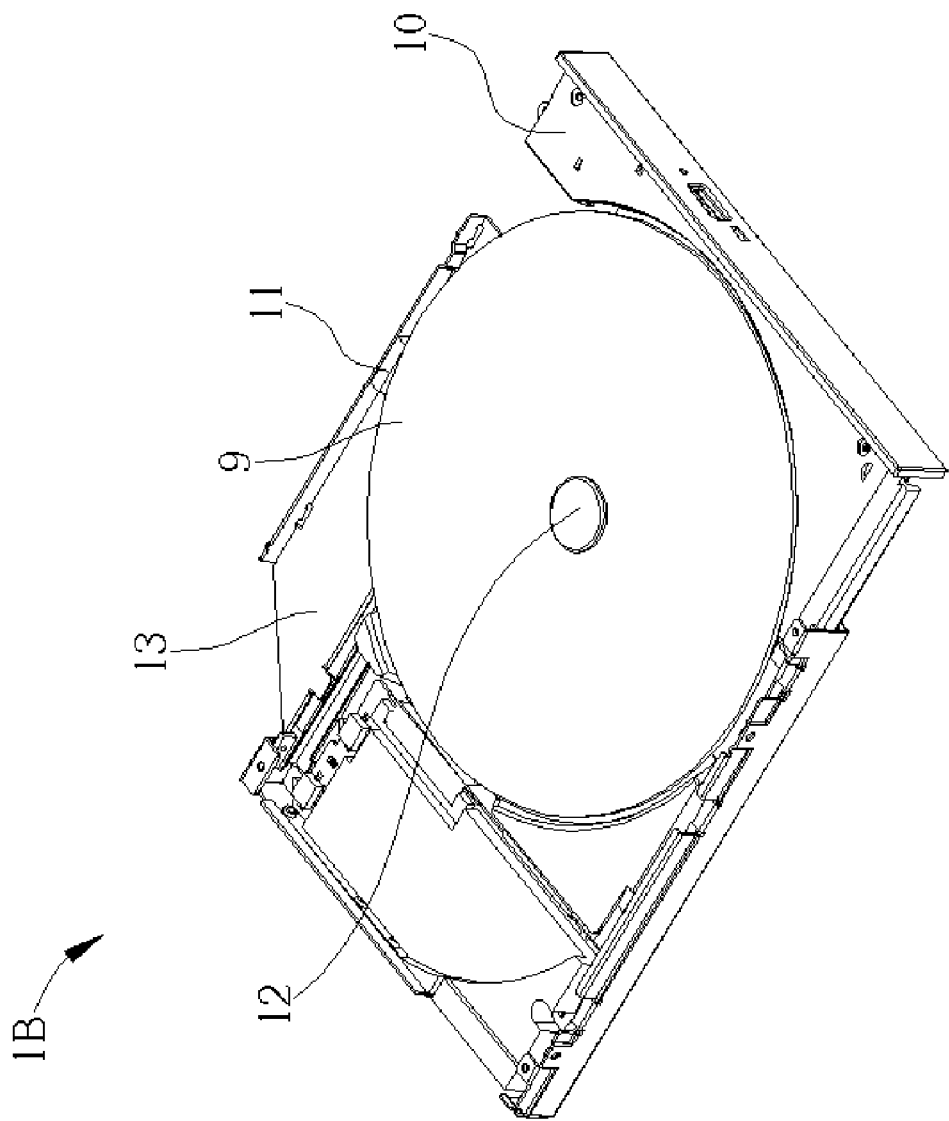
FIG. 2 is a perspective view illustrating the slim type optical disc drive loading the disc according to the prior art.
Figure 3:
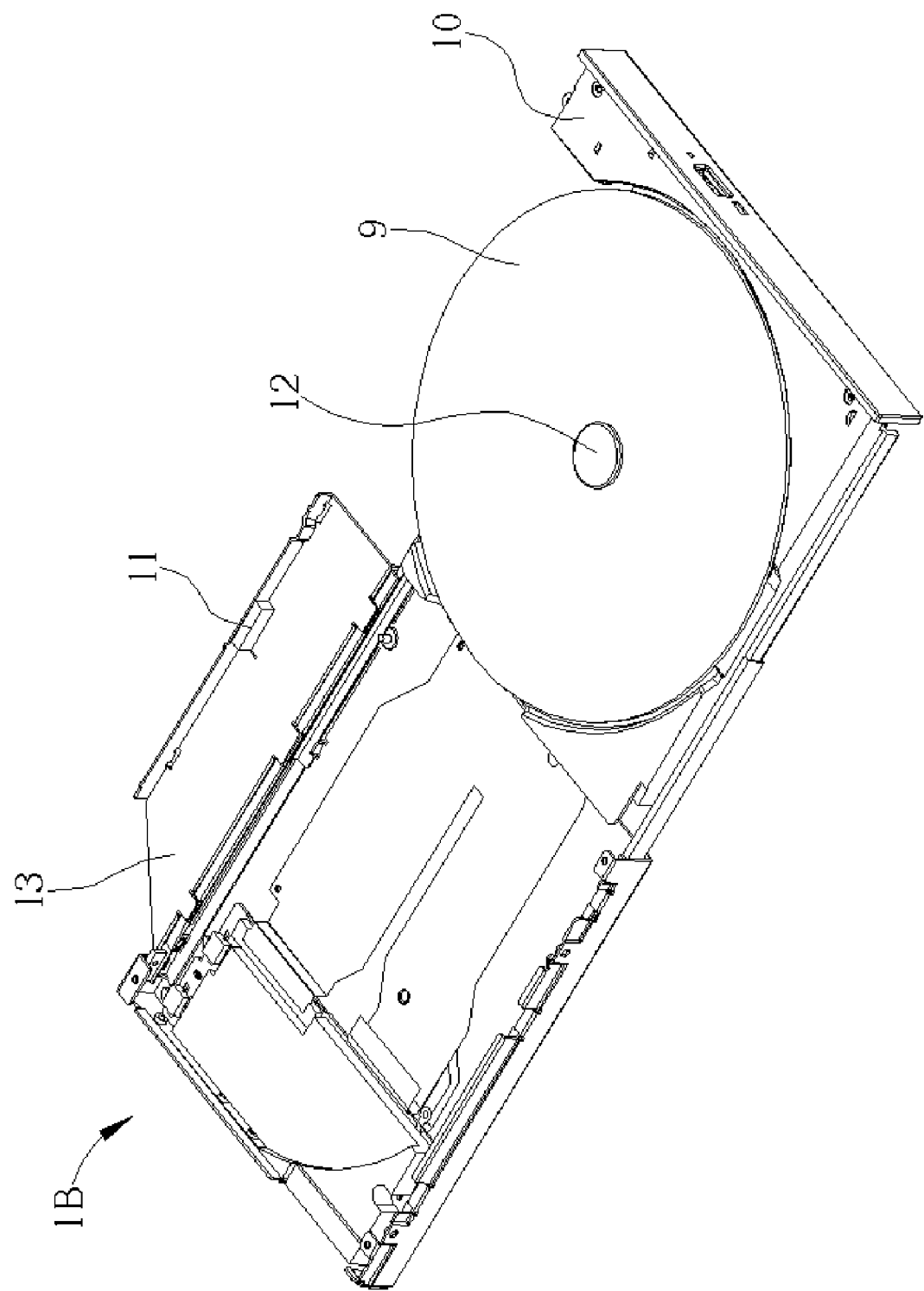
FIG. 3 is a perspective view illustrating the slim type optical disc drive after the disc has been ejected according to the prior art.
Figure 4:
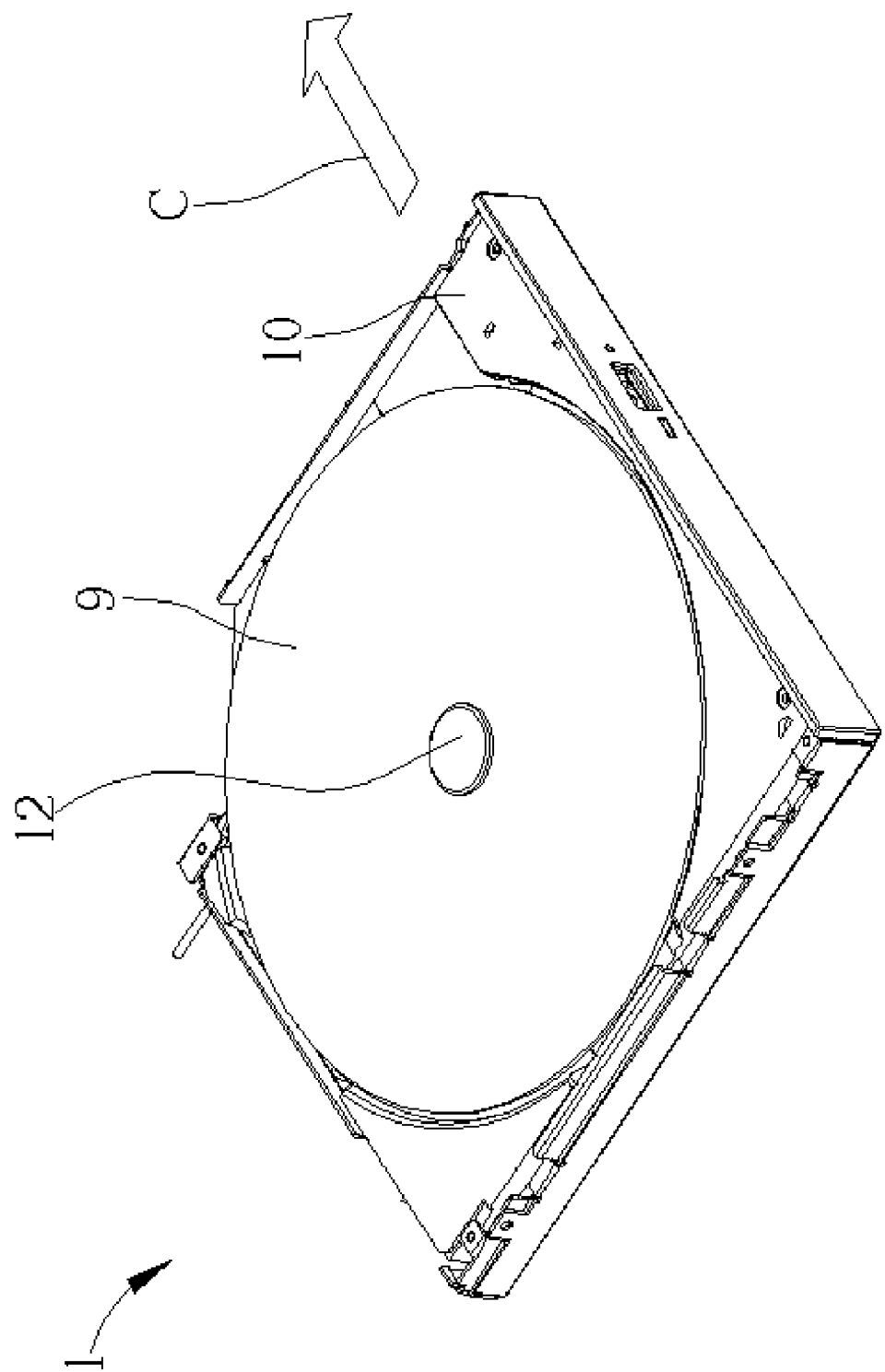
FIG. 4 is a perspective view of a slim type optical disc drive comprising a disc braking device after the slim type optical disc drive has loaded a disc according to a first embodiment of the present invention.
Figure 5:
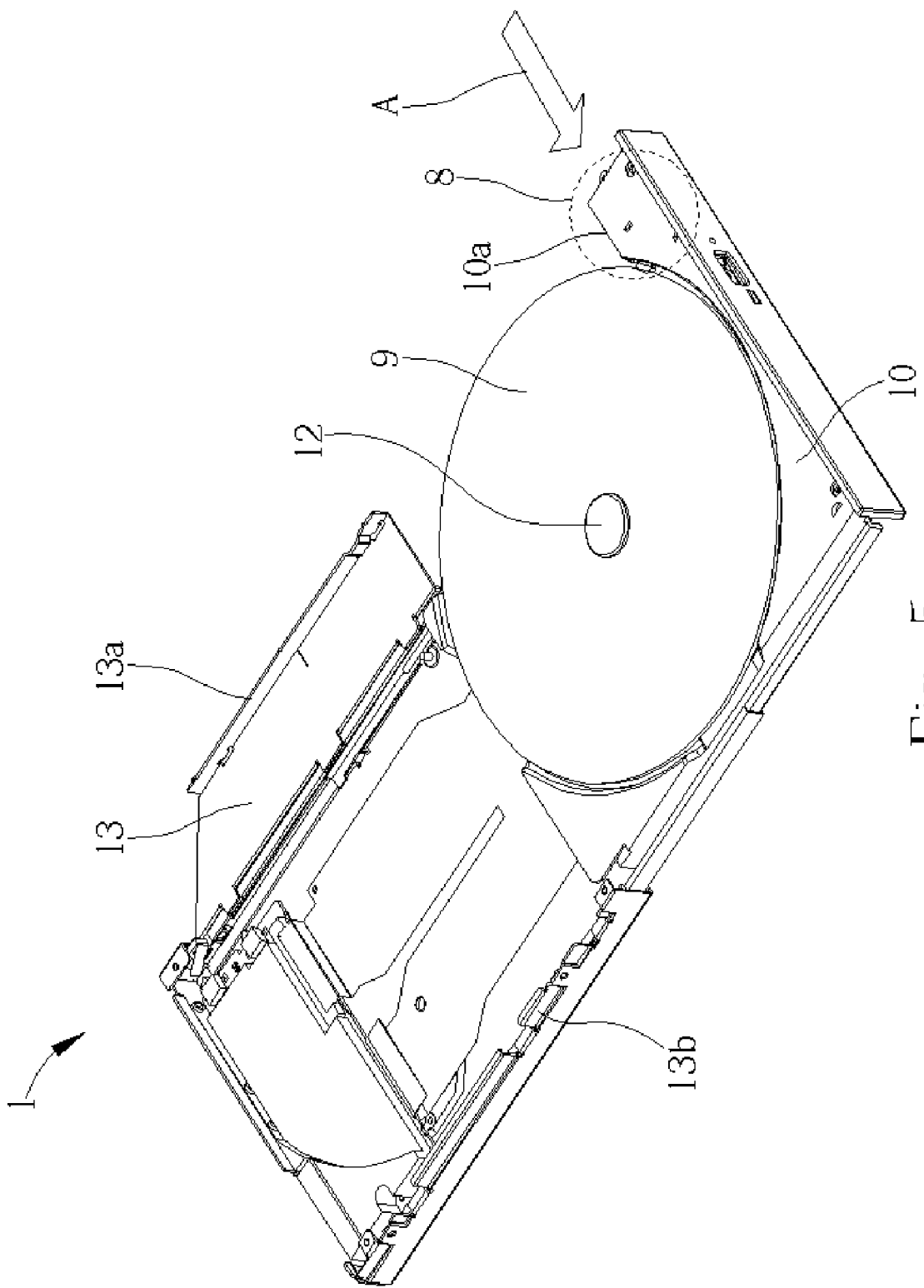
FIG. 5 is a perspective view of the slim type optical disc drive comprising the disc braking device after the disc has been ejected from the slim type optical disc drive according to the first embodiment of the present invention.
Figure 6:
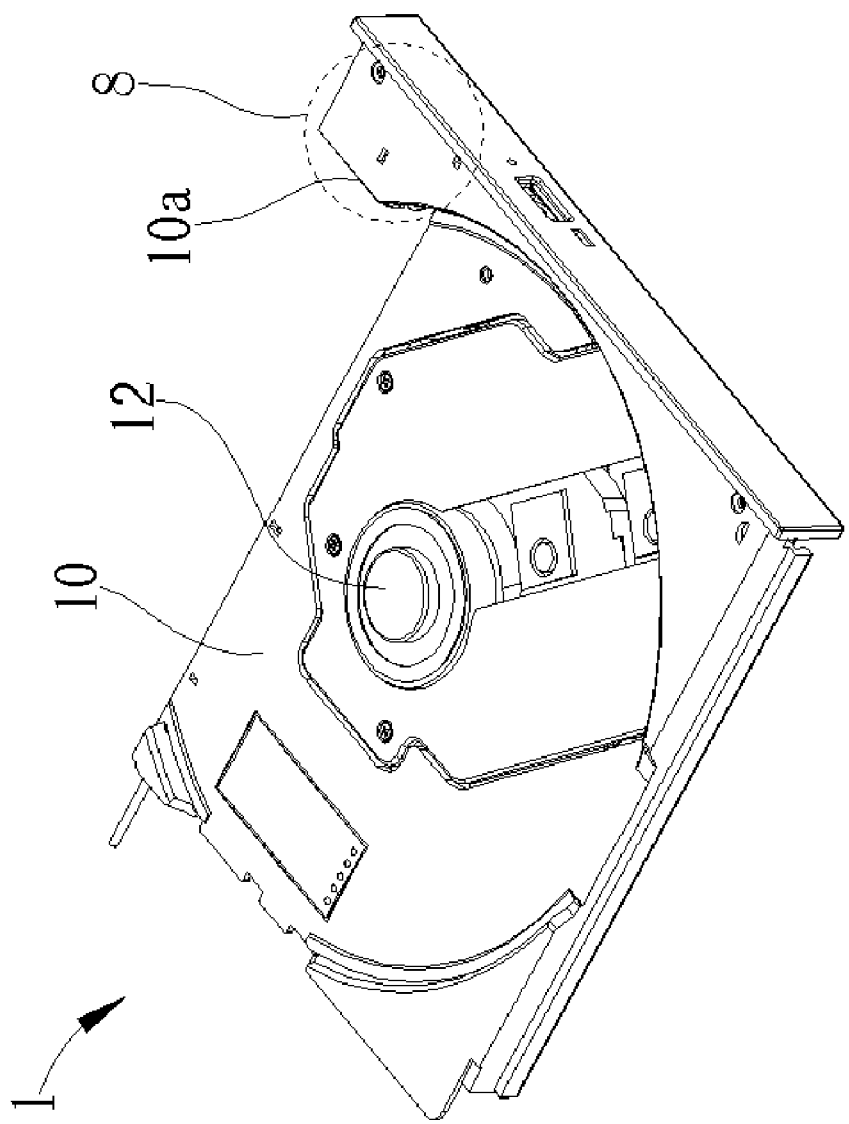
FIG. 6 is a perspective view of relative positions of individual components of the slim type optical disc drive comprising the disc braking device according to the first embodiment of the present invention.
Figure 7:
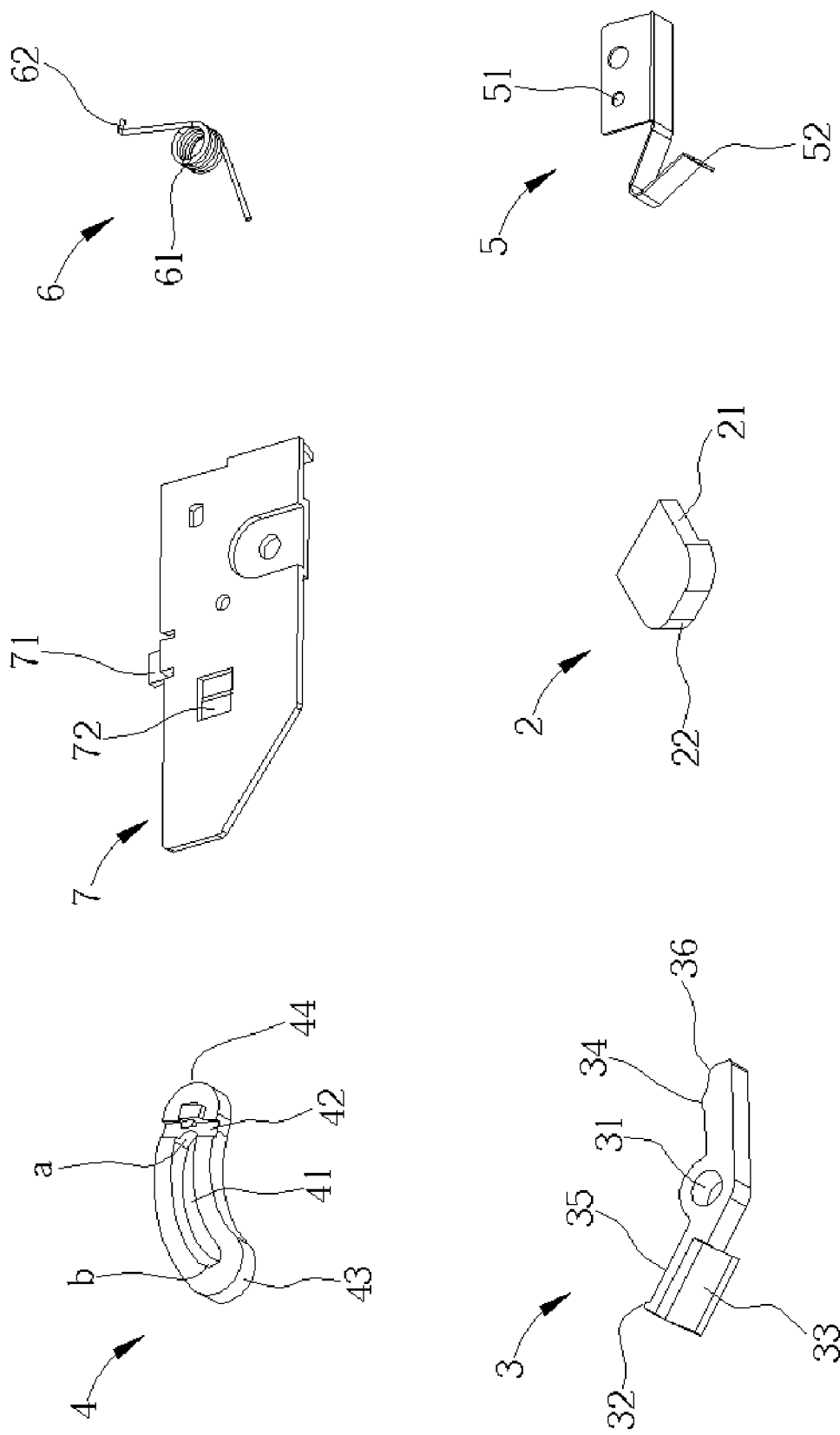
FIG. 7 is a perspective view of individual components of the disc braking device shown in FIG. 6 according to the first embodiment of the present invention.
Figure 8:
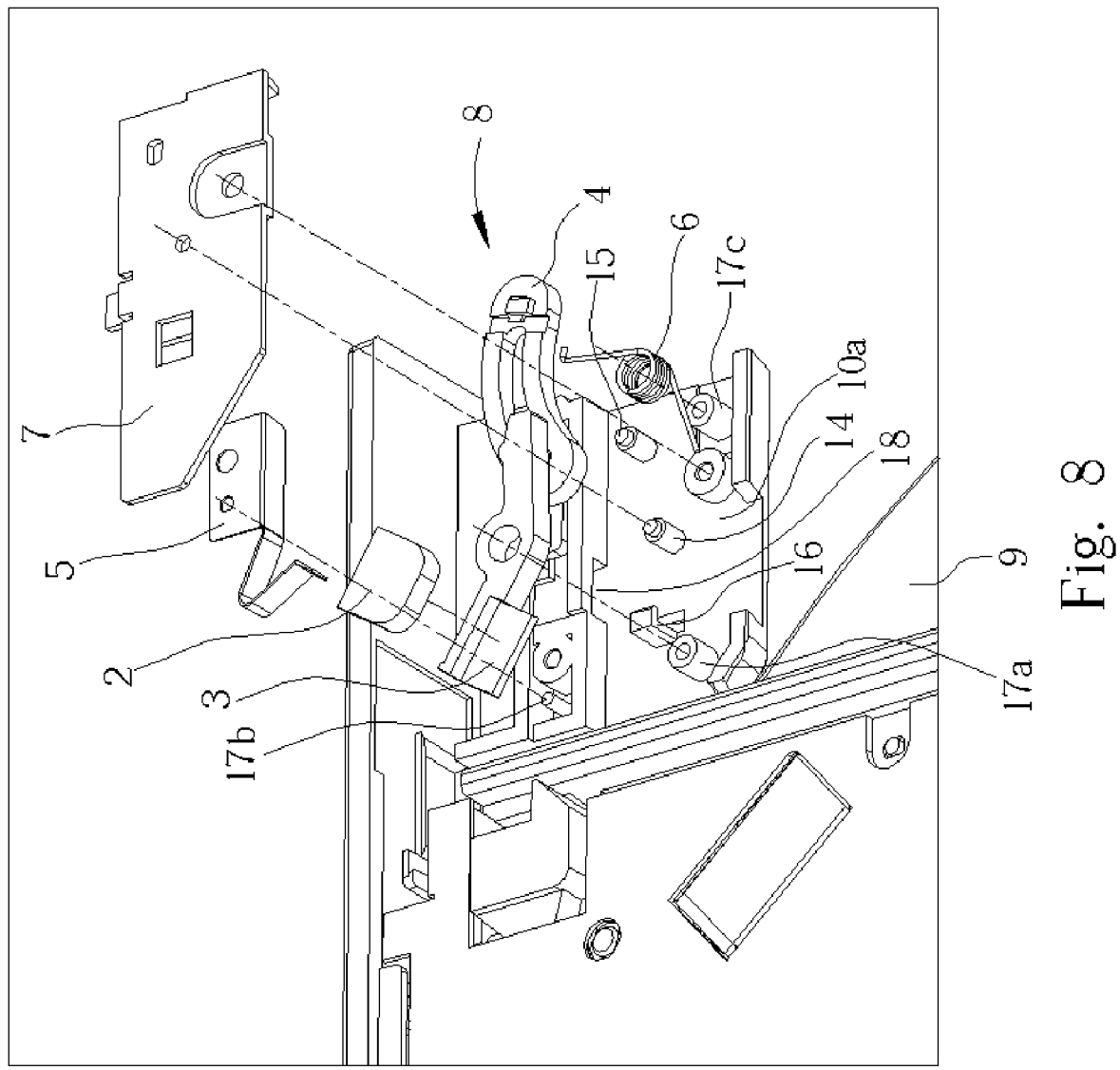
FIG. 8 is a detailed perspective view of relative positions of individual components of the disc braking device shown in FIG. 6 according to the first embodiment of the present invention.

The first embodiment of the present invention is described as follows. Please refer to FIG. 4. FIG. 4 is a perspective view of a slim type optical disc drive 1 comprising a disc braking device after the slim type optical disc drive 1 has loaded a disc 9 according to a first embodiment of the present invention. The slim type optical disc drive 1 comprises a disc tray 10. The disc tray 10 comprises a turn table 12 utilized for positioning and rotating the disc 9 at a high speed for accessing the data from the disc 9. Please refer to FIG. 5. FIG. 5 is a perspective view of the slim type optical disc drive 1 comprising the disc braking device 8 after the disc 9 has been ejected from the slim type optical disc drive 1 according to the first embodiment of the present invention. The slim type optical disc drive 1 comprises a bottom cover 13. The bottom cover 13 comprises two lateral sides 13a and 13b. Please refer to FIG. 6. FIG. 6 is a perspective view of relative positions of individual components of the slim type optical disc drive 1 comprising the disc braking device 8 according to the first embodiment of the present invention. The disc braking device 8 according to the first embodiment of the present invention is located on a structure portion 10a of the disc tray 10. Please refer to FIG. 6 and FIG. 7. FIG. 7 is a perspective view of individual components of the disc braking device 8 shown in FIG. 6 according to the first embodiment of the present invention. The disc braking device 8 according to the first embodiment of the present invention comprises a braking component 2, a braking rod 3, a tappet 4, an elastic unit 5, an elastic component 6 and a covering component 7. The braking rod 3 comprises a positioning hole 31, a first extending part 32, a third extending part 33, a pressing part 35, a side part 36 and a second extending part 34. The positioning hole 31 is installed and rotatable on the positioning pin 17a of the structure portion 10a of the disc tray 10. The braking component 2 comprises a bottom part 21 being installed on the third extending part 33 of the braking rod 3. A contacting part 22 touches the rim of the disc 9 to make the disc 9 stop rotating before the disc 9 is ejected from the slim type optical disc drive 1. The braking component 2 can be made of sponge or other soft materials having equivalent characteristics. In the present embodiment (the first embodiment), the braking component 2 is made of sponge. The tappet 4 comprises a sliding slot 41, a positioning hook 42, a first flange 43 and a second flange 44. The structure portion 10a further comprises a first guiding peg 14 and a second guiding peg 15 located in the sliding slot 41 and utilized for guiding the tappet 4 to slide. The first flange 43 touches the second extending part 34 and the side part 36 of the braking rod 3 and drives the related components to move, in order to make the contacting part 22 of the braking component 2 touch or be detached from the rim of the disc 9. The elastic unit 5 comprises a positioning hole 51 and a pressing part 52. The elastic unit 5 is installed on the positioning pin 17b of the structure portion 10a of the disc tray 10 via the positioning hole 51 (please refer to FIG. 8). The pressing part 52 touches the pressing part 35 of the braking rod 3, in order to provide a pressing force for the braking rod 3 to force the disc 9 to stop rotating. The elastic unit 5 can be a leaf spring or a unit having equivalent function. In the present embodiment (the first embodiment), the elastic unit 5 is a leaf spring. The elastic component 6 comprises a main winding 61 and a positioning part 62. The main winding 61 is installed on the positioning pin 17c of the structure portion 10a of the disc tray 10. The positioning part 62 hooks the positioning hook 42 of the tappet 4. Hence, a torque force is provided by the elastic component 6 to drive the contacting part 22 of the braking component 2 to touch the rim of the disc 9. The elastic component 6 can be a spring made of metal or plastic materials. In the present embodiment (the first embodiment), the elastic component 6 is a spring. The covering component 7 comprises an extending part 71 and a positioning slot 72. The covering component 7 is utilized for positioning and covering other components of the disc braking device 8 according to the present invention. Please refer to FIG. 6, FIG. 7 and FIG. 8. FIG. 8 is a detailed perspective view of relative positions of individual components of the disc braking device 8 shown in FIG. 6 according to the first embodiment of the present invention. The extending part 71 is installed in the positioning slot 18 of the structure portion 10a of the disc tray 10. The positioning hook 16 of the structure portion 10a of the disc tray 10 is installed in the positioning slot 72.

Please proceed to refer to FIG. 6, FIG. 7 and FIG. 8. The bottom part 21 of the braking component 2 is installed on the third extending part 33 of the braking rod 3. The braking rod 3 is installed and rotatable on the positioning pin 17a of the structure portion 10a via the positioning hole 31. The tappet 4 is installed and is able to slide on the structure portion 10a. The tappet 4 is guided by the first guiding peg 14 and the second guiding peg 15 of the structure portion 10a. The elastic component 6 is installed and rotatable on the positioning pin 17c of the structure portion 10a via the main winding 61. The positioning part 62 hooks the positioning hook 42 of the tappet 4. The elastic unit 5 is installed on the positioning pin 17b of the structure portion 10a of the disc tray 10. The pressing part 52 touches the pressing part 35 of the braking rod 3 and is used to prevent the pressing part 52 from detaching from the first extending part 32 of the braking rod 3. The covering component 7 is installed in the positioning slot 18 of the structure portion 10a of the disc tray 10 via the extending part 71. The positioning hook 16 of the structure portion 10a of the disc tray 10 is installed in the positioning slot 72. The covering component 7 is utilized for positioning and covering other components of the disc braking device 8 according to the present invention. The above-mentioned components make up the disc braking device 8 according to the present invention.

Figure 9:
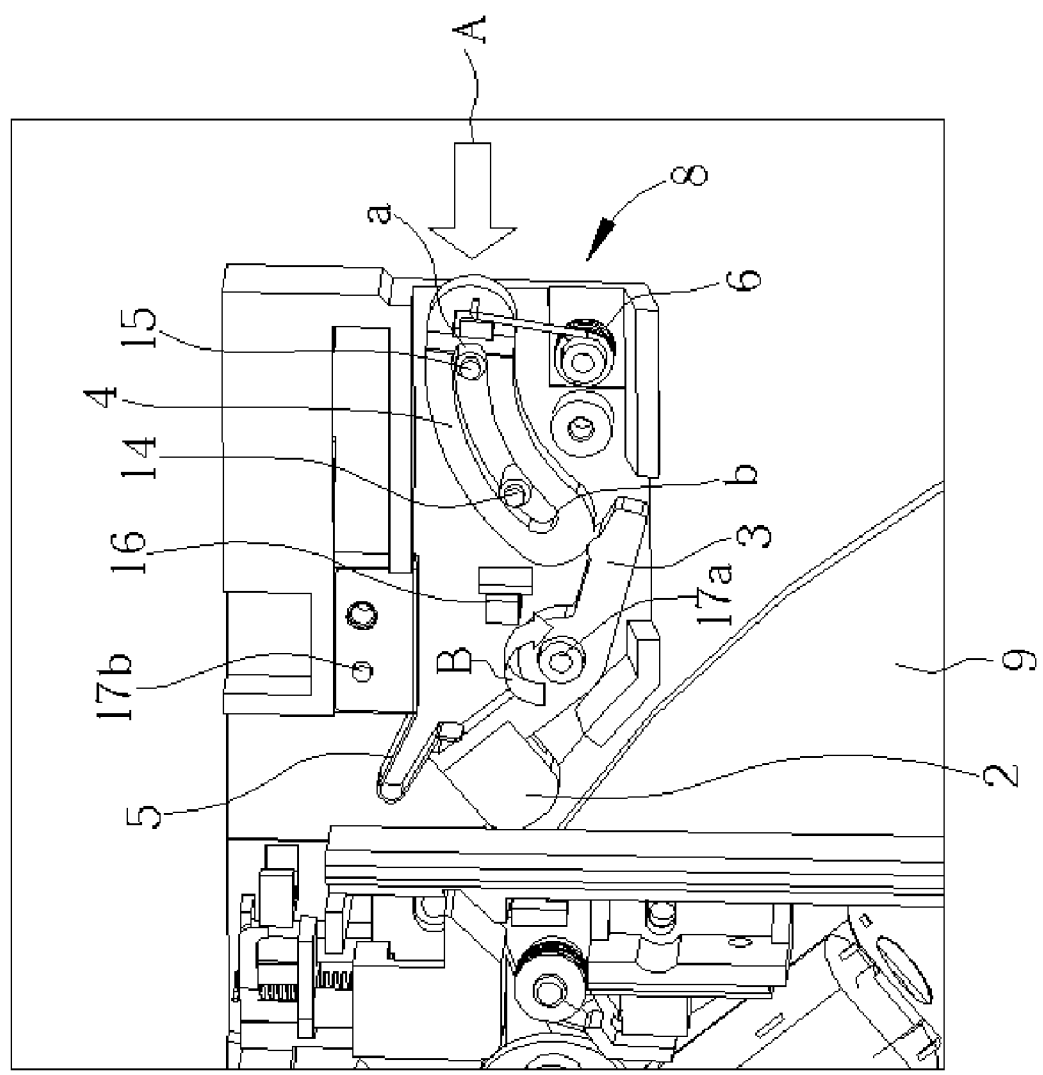
FIG. 9 is a top view of the disc braking device after loading the disc shown in FIG. 6 according to the first embodiment of the present invention.
Figure 10:
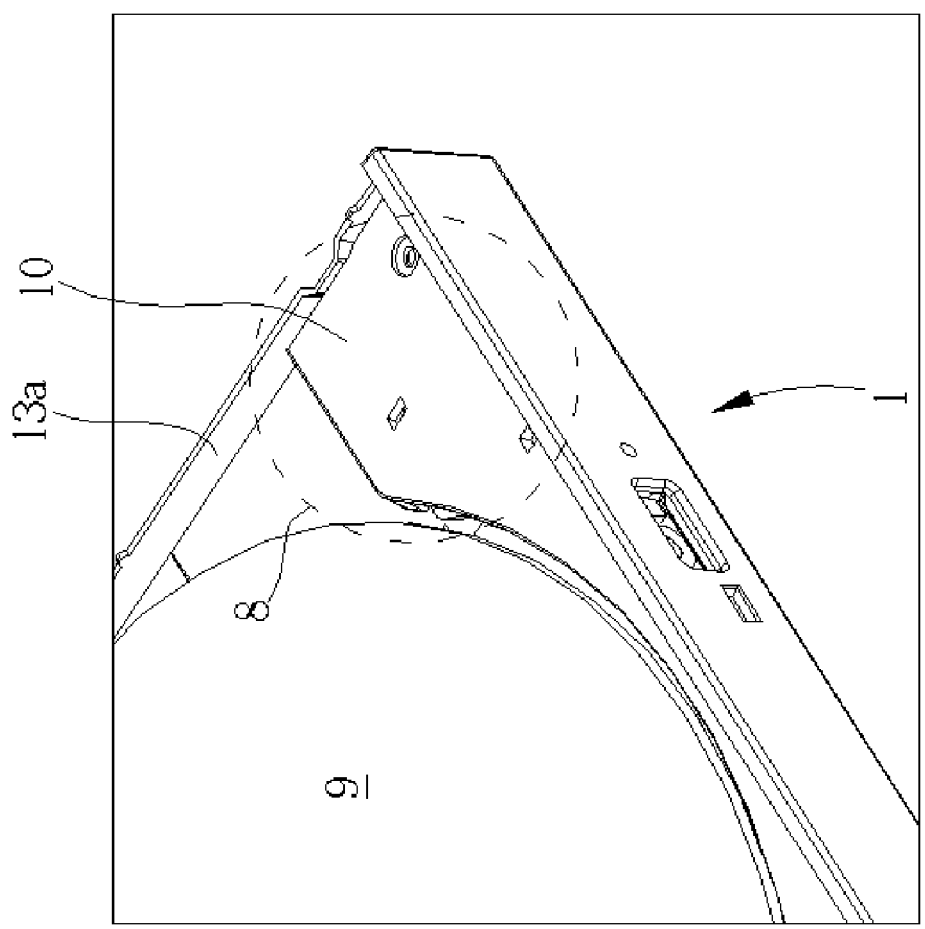
FIG. 10 is a perspective view of the slim type optical disc drive comprising the disc braking device after the slim type optical disc drive has loaded the disc according to the first embodiment of the present invention.

Please refer to FIG. 5, FIG. 6 and FIG. 7. Before the slim type optical disc drive 1 starts to load the disc 9, the second flange 44 of the tappet 4 touches the lateral side 13a of the bottom cover 13 and is driven by a pressing force in a first direction (direction A). Please refer to FIG. 6, FIG. 7 and FIG. 9. FIG. 9 is a top view of the disc braking device 8 after loading the disc 9 shown in FIG. 6 according to the first embodiment of the present invention. The covering component 7 is removed in FIG. 9. The second flange 44 of the tappet 4 is driven by a pressing force in the first direction (direction A). Meanwhile, the tappet 4 slides such that the second guiding peg 15 touches a second extreme position of the sliding slot 41 (position a), and therefore, the tappet 4 slides in the first direction (direction A). The first flange 43 touches the second extending part 34 of the braking rod 3, and therefore the braking rod 3 is driven to rotate in a second direction (direction B) to drive the contacting part 22 of the braking component 2 to be detached from the rim of the disc 9 and to press the pressing part 52 of the elastic unit 5. Please refer to FIG. 10. FIG. 10 is a perspective view of the slim type optical disc drive 1 comprising the disc braking device 8 after the slim type optical disc drive 1 has loaded the disc 9 according to the first embodiment of the present invention.

Figure 11:
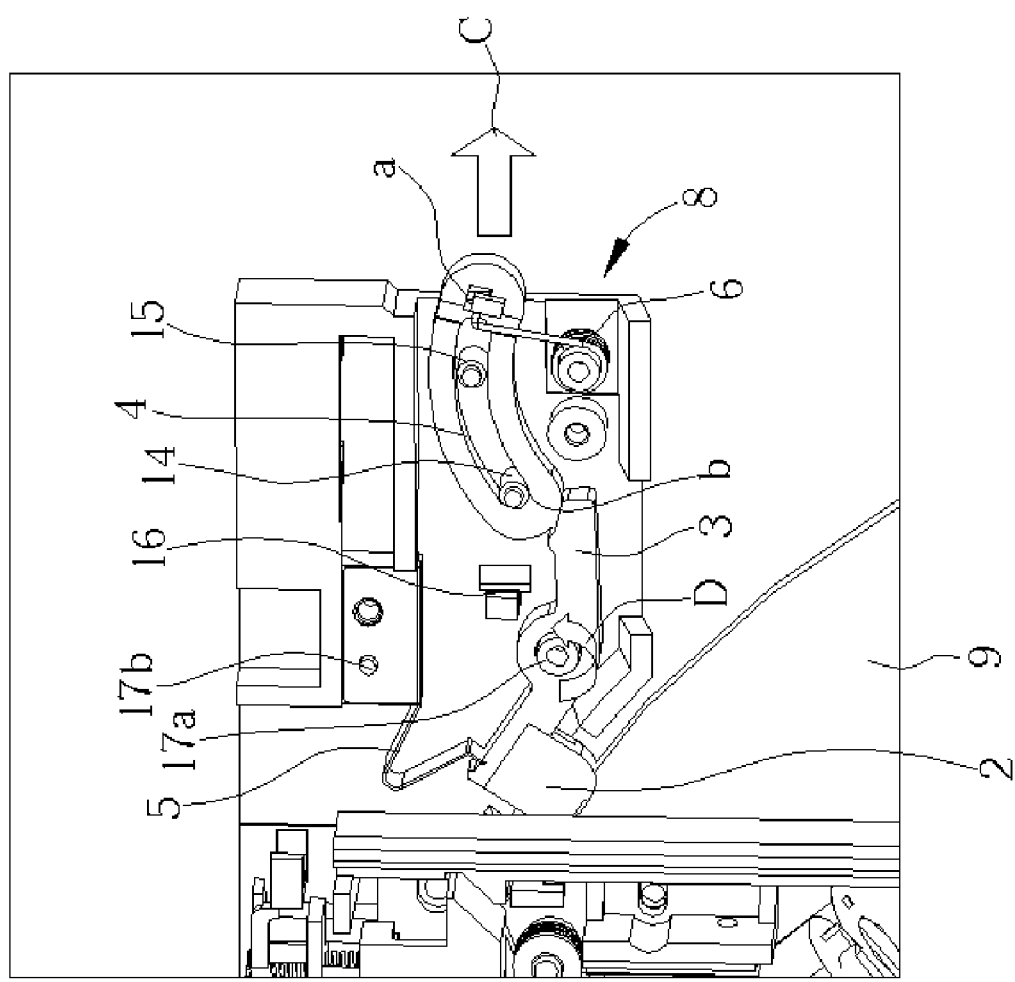
FIG. 11 is a top view of the disc braking device after the disc has been ejected from the slim type optical disc drive according to the first embodiment of the present invention.
Figure 12:
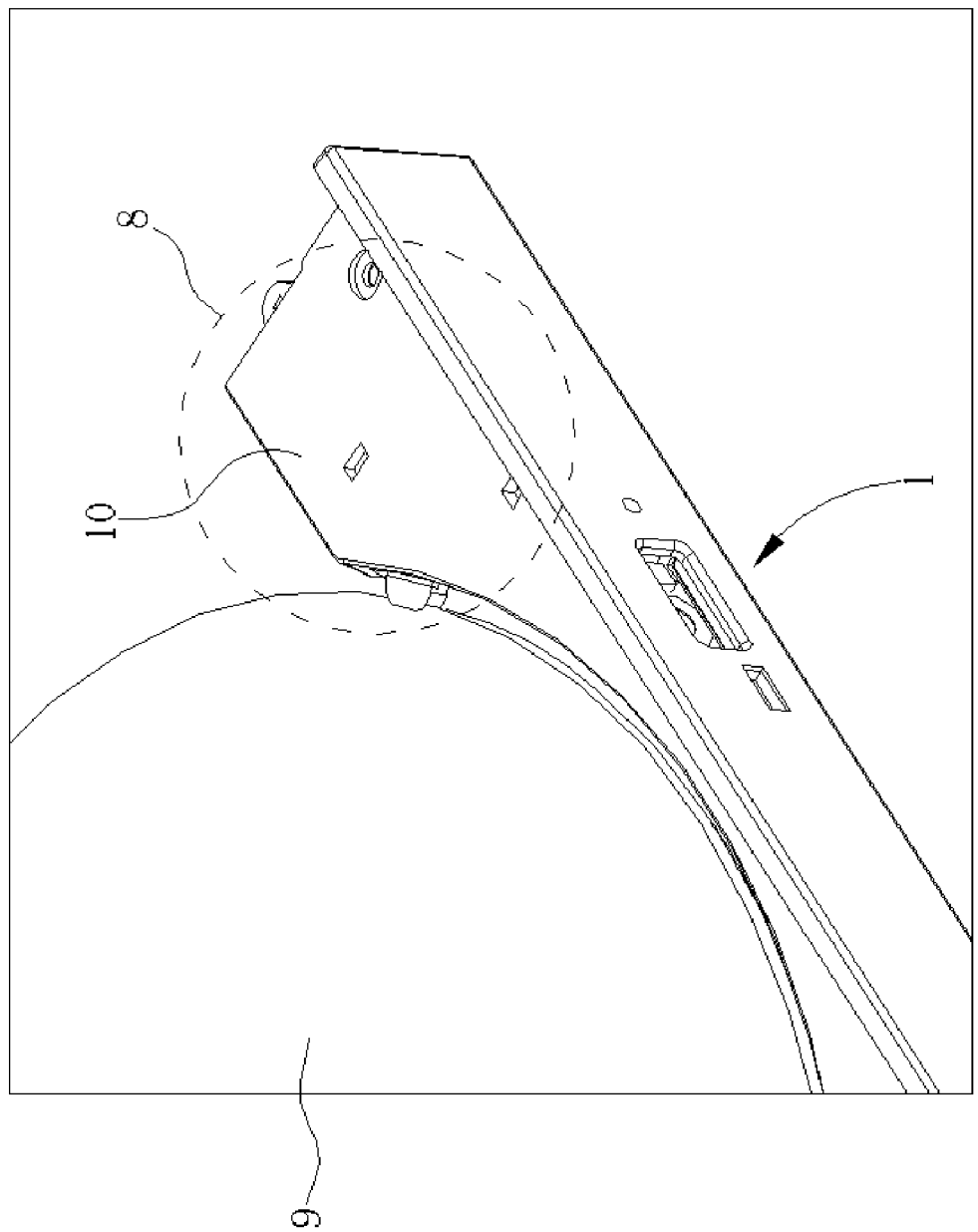
FIG. 12 is a perspective view of the slim type optical disc drive comprising the disc braking device after the disc has been ejected from the slim type optical disc drive according to the first embodiment of the present invention.

Please refer to FIG. 4, FIG. 6 and FIG. 7. When the disc 9 is going to be ejected from the slim type optical disc drive 1, the restriction on the second flange 44 of the tappet 4 caused by the lateral side 13a of the bottom cover 13 is removed and then the second flange 44 flips out in a third direction (direction C). Please refer to FIG. 6, FIG. 7 and FIG. 11. FIG. 11 is a top view of the disc braking device 8 after the disc 9 has been ejected from the slim type optical disc drive 1 according to the first embodiment of the present invention, wherein the covering component 7 has been removed. When the second flange 44 of the tappet 4 flips out in the third direction (direction C), meanwhile, because of the torque force provided by the elastic component 6, the tappet 4 slides and the first guiding peg 14 touches a first extreme position (position b) of the sliding slot 41 such that the tappet 4 slides in a third direction (direction C). At the same time, the pressing force provided by the elastic unit 5 drives the braking rod 3 to rotate in a fourth direction (direction D) to go back to the original position. The first flange 43 touches the side part 36 of the braking rod 3 such that the contacting part 22 of the braking component 2 touches the rim of the disc 9. Hence, the friction force between the braking component 2 and the disc 9 and the pressing force provided by the elastic unit 5 force the disc 9 to stop rotating. Please refer to FIG. 12. FIG. 12 is a perspective view of the slim type optical disc drive 1 comprising the disc braking device 8 after the disc 9 has been ejected from the slim type optical disc drive 1 according to the first embodiment of the present invention.

Figure 13:
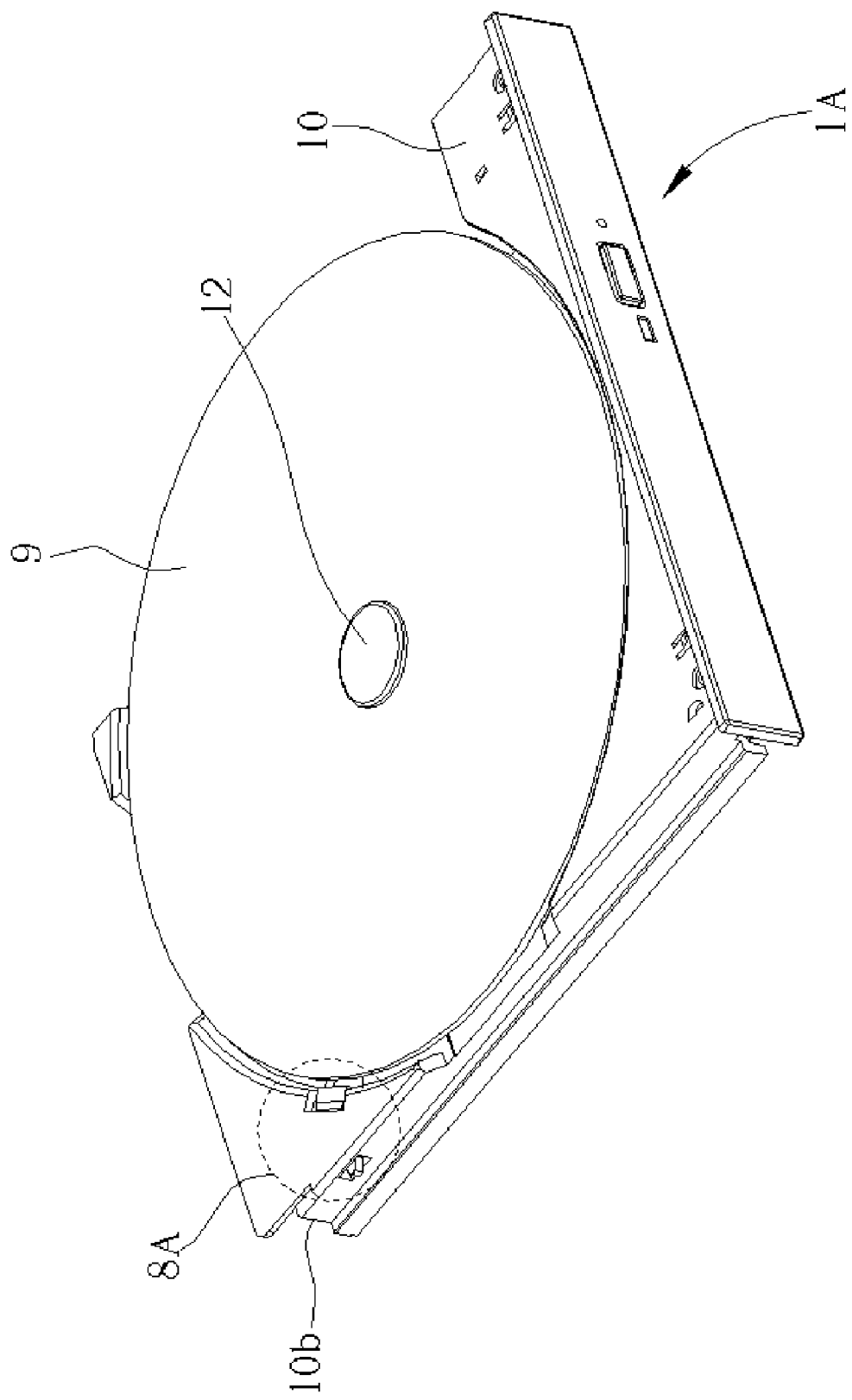
FIG. 13 is a perspective view of a slim type optical disc drive comprising a disc braking device according to a second embodiment of the present invention.
Figure 14:
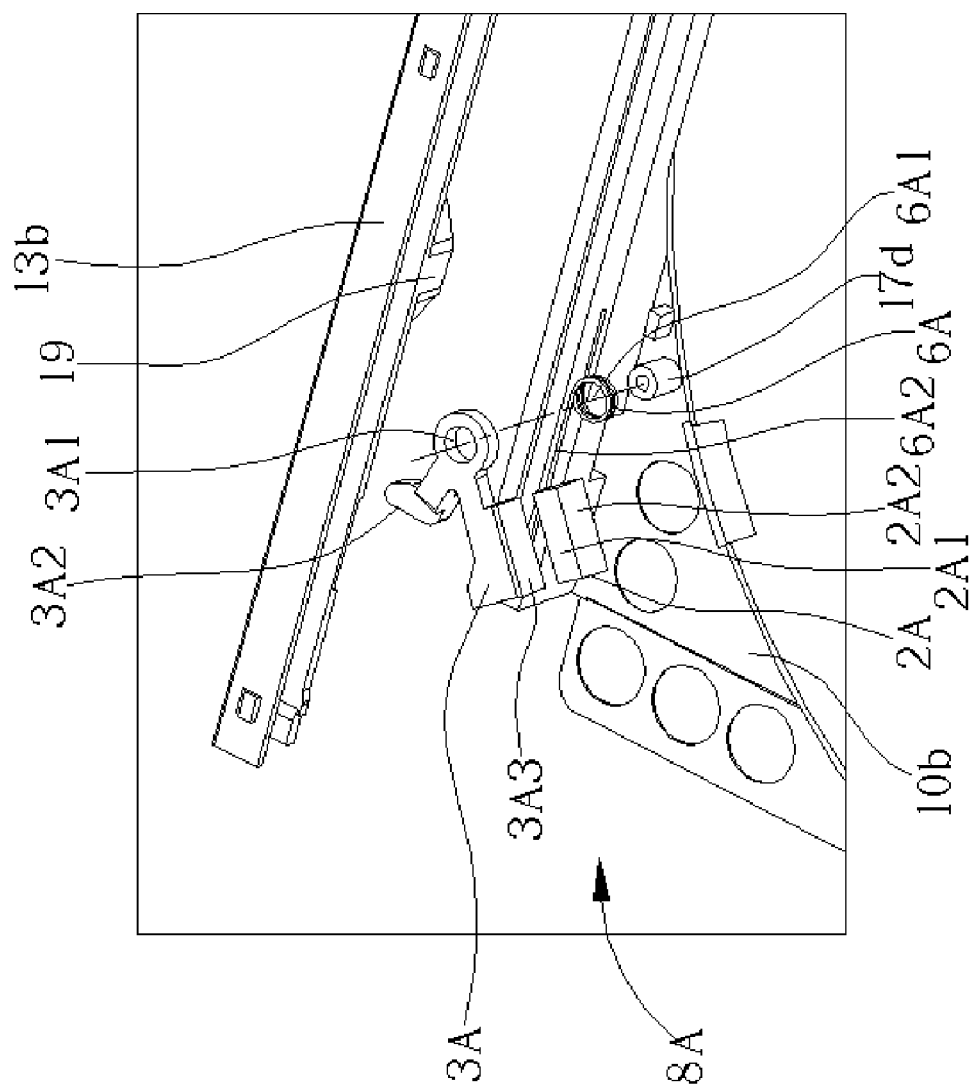
FIG. 14 is a detailed perspective view of relative positions of individual components of the disc braking device shown in FIG. 13 according to the second embodiment of the present invention.
Figure 15:
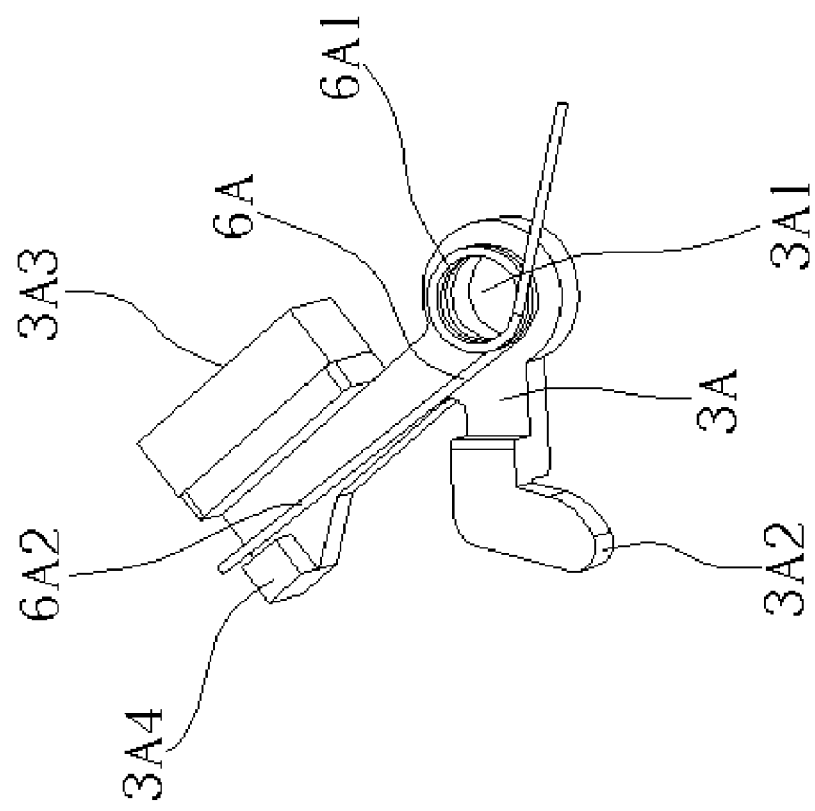
FIG. 15 is a perspective view of relative positions of the braking rod and the elastic component according to the second embodiment of the present invention.

The second embodiment of the present invention is described as follows. Please refer to FIG. 13. FIG. 13 is a perspective view of a slim type optical disc drive 1OLE_LINK1A comprising a disc braking device 8A according to a second embodiment of the present invention. The disc braking device 8A according to the second embodiment of the present invention is located on the structure portion 10b of the disc tray 10. Please refer to FIG. 13 and FIG. 14. FIG. 14 is a detailed perspective view of relative positions of individual components of the disc braking device 8A shown in FIG. 13 according to the second embodiment of the present invention. The disc braking device 8A according to the second embodiment of the present invention comprises a braking component 2A, a braking rod 3A, an elastic component 6A and a raising part 19. Please refer to FIG. 13, FIG. 14 and FIG. 15. FIG. 15 is a perspective view of relative positions of the braking rod 3A and the elastic component 6A according to the second embodiment of the present invention. The braking rod 3A comprises a positioning hole 3A1, a flange 3A2, a third extending part 3A3 and a positioning hook 3A4. The braking component 2A comprises a bottom part 2A1 being installed on the extending part 3A3 of the braking rod 3A. The contacting part 2A2 touches the rim of the disc 9 in order to force the disc 9 to stop rotating. The braking component 2A can be made of sponge or other soft materials having equivalent characteristics. In the present embodiment (the second embodiment), the braking component 2A is made of sponge. The elastic component 6A comprises a main winding 6A1 and a positioning part 6A2. The main winding 6A1 is installed and rotatable on the positioning pin 17d of the structure portion 10b of the disc tray 10. The braking rod 3A is installed and rotatable on the positioning pin 17d via positioning hole 3A1. The braking rod 3A touches the elastic component 6A, and the positioning part 6A2 hooks the positioning hook 3A4 of the braking rod 3A in order to provide a torque force to drive the contacting part 2A2 of the braking component 2A to be detached from the rim of the disc 9. The elastic component 6A can be a spring made of metal or plastic materials. In the present embodiment (the second embodiment), the elastic component 6A is a spring. The raising part 19 is installed on the lateral side 13b of the bottom cover 13.

Figure 16:
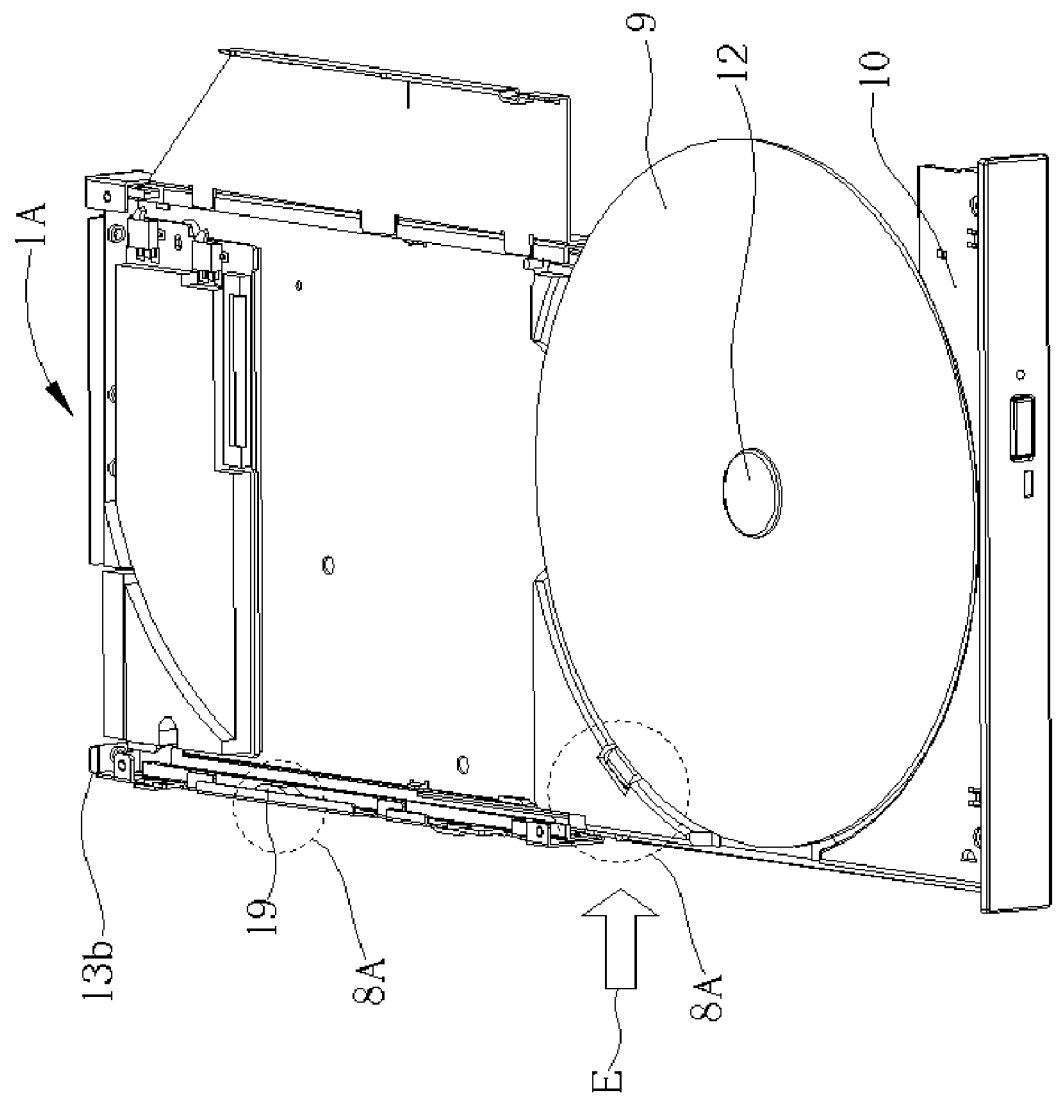
FIG. 16 is a perspective view of the slim type optical disc drive comprising the disc braking device after the disc has been ejected from the slim type optical disc drive according to the second embodiment of the present invention.
Figure 17:
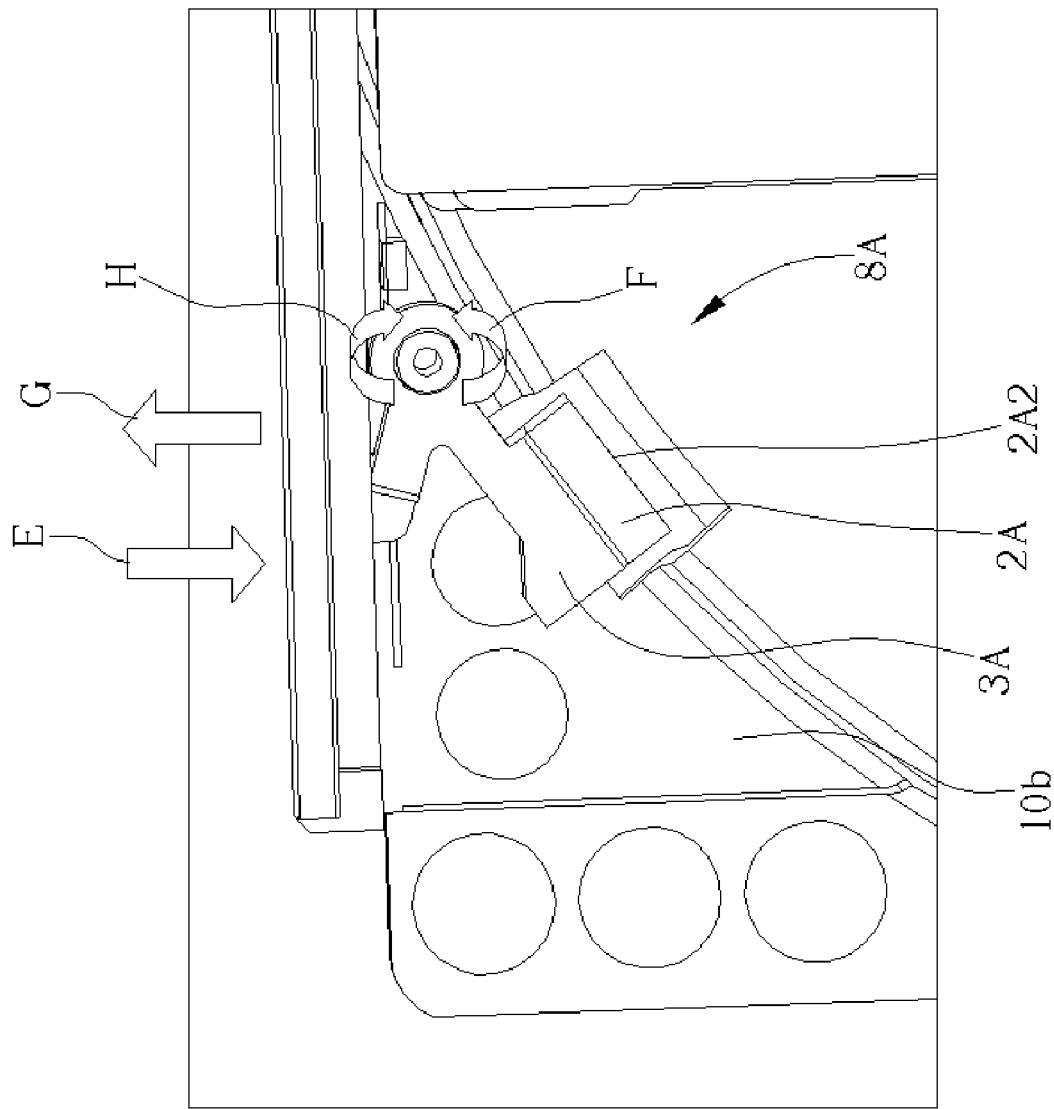
FIG. 17 is a top view of relative positions of individual components of the disc braking device shown in FIG. 16 after the disc has been ejected from the slim type optical disc drive according to the second embodiment of the present invention.
Figure 18:
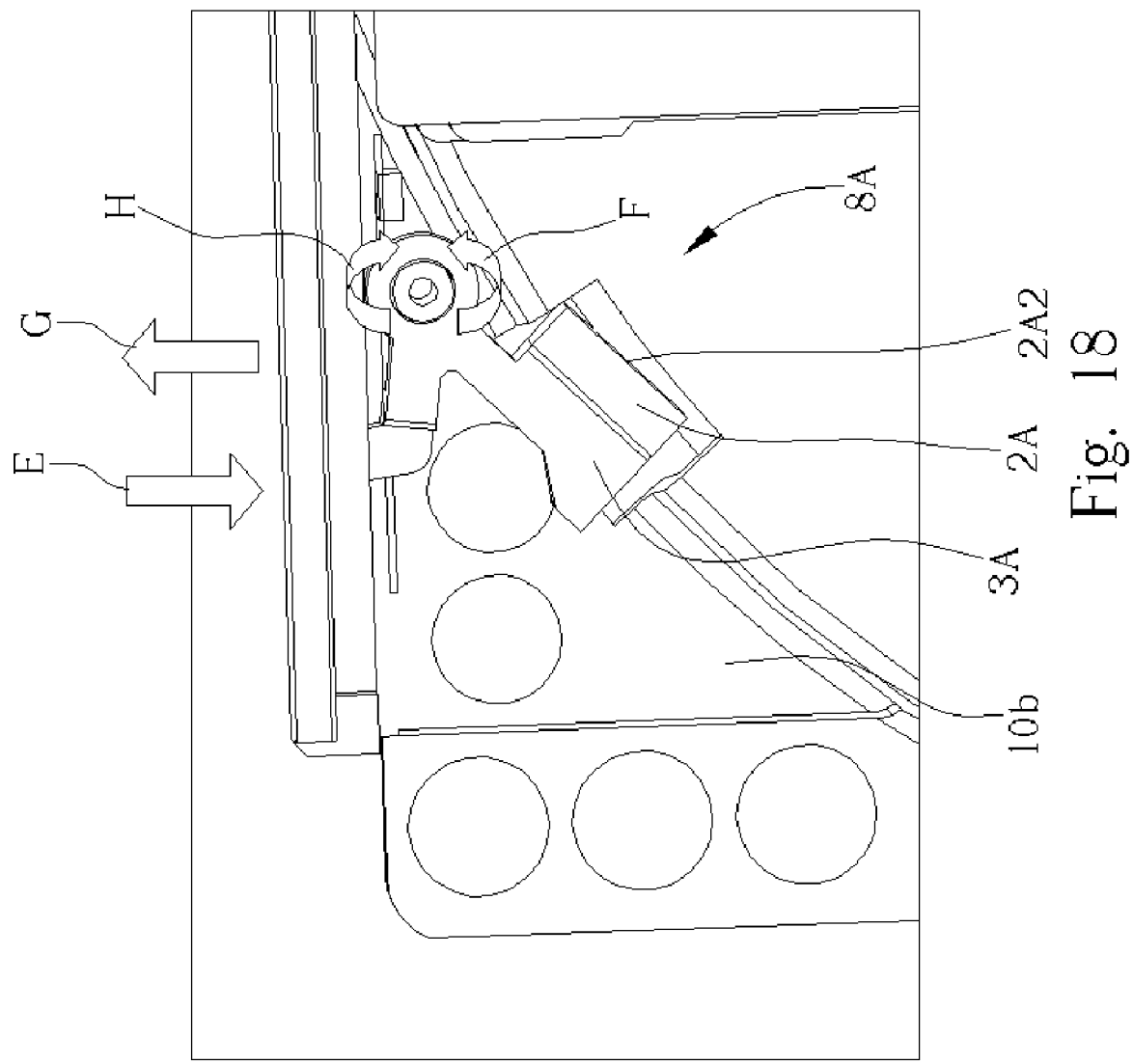
FIG. 18 is a perspective view of relative positions of individual components of the disc braking device shown in FIG. 16 when the slim type optical disc drive is loading the disc according to the second embodiment of the present invention.
Figure 19:
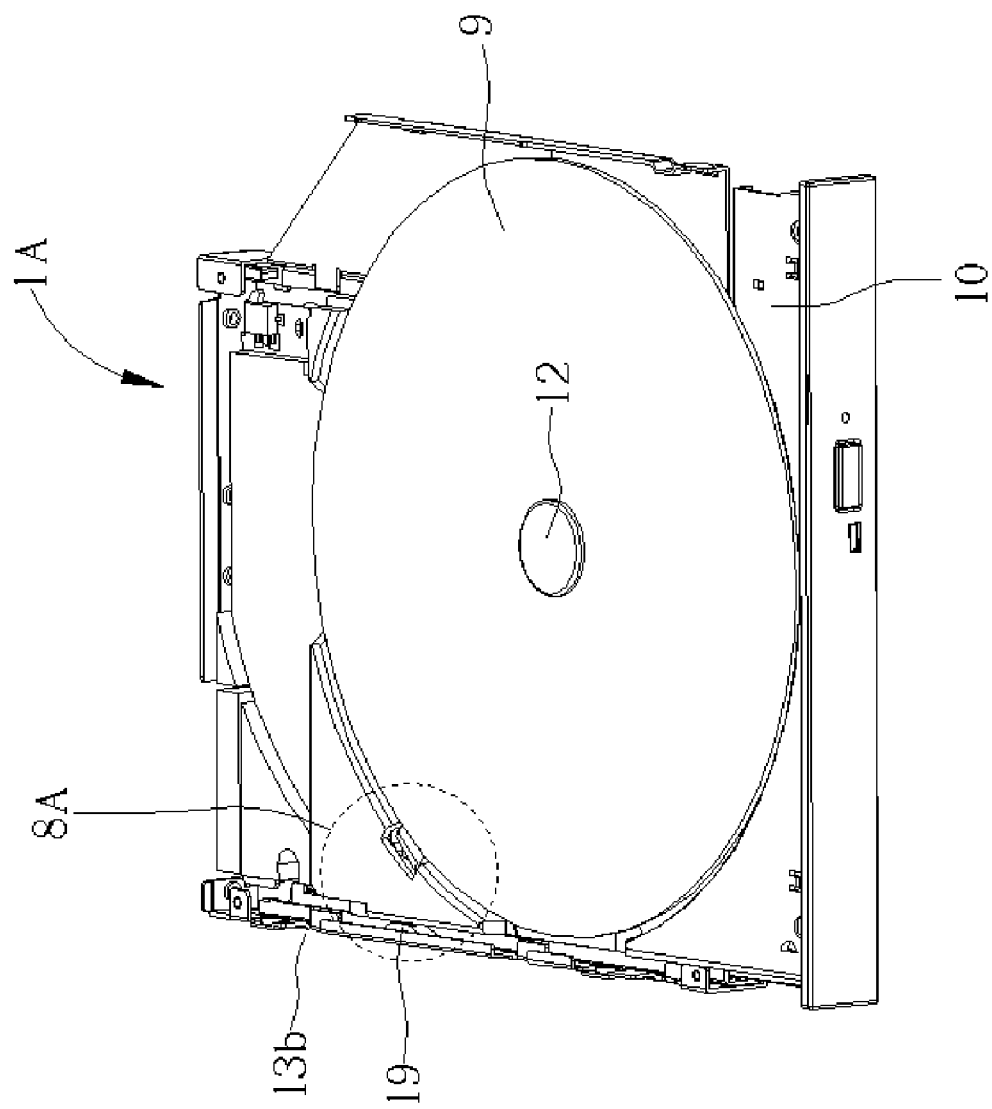
FIG. 19 is a perspective view of the slim type optical disc drive comprising the disc braking device when the slim type optical disc drive is loading the disc according to the second embodiment of the present invention.
Figure 20:
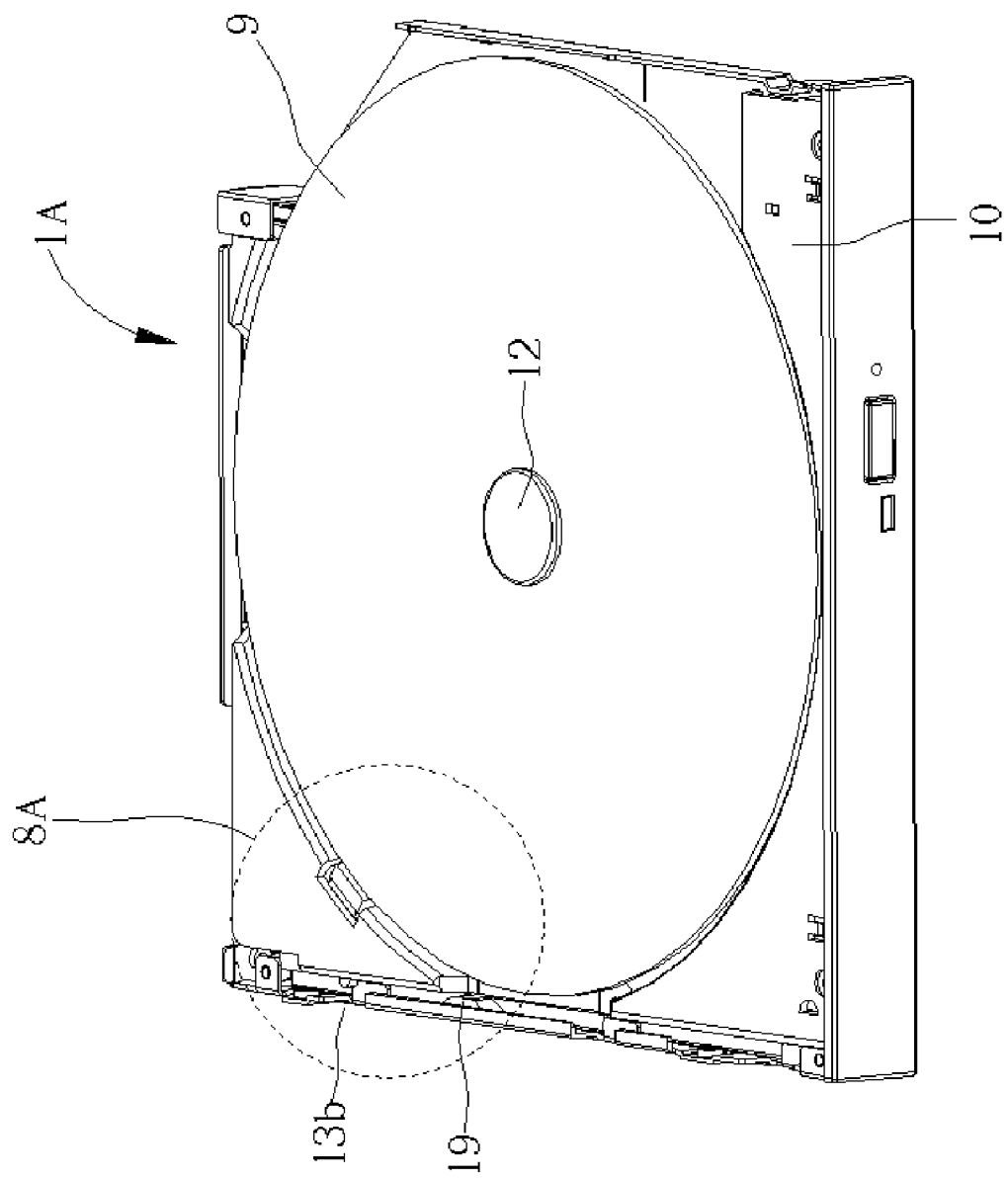
FIG. 20 is a perspective view of the slim type optical disc drive comprising the disc braking device after the slim type optical disc drive has loaded the disc according to the second embodiment of the present invention.

Please refer to FIG. 16. FIG. 16 is a perspective view of the slim type optical disc drive 1A comprising the disc braking device 8A after the disc 9 has been ejected from the slim type optical disc drive 1A according to the second embodiment of the present invention. Please refer to FIG. 14, FIG. 15 and FIG. 17. FIG. 17 is a top view of relative positions of individual components of the disc braking device 8A shown in FIG. 16 after the disc 9 has been ejected from the slim type optical disc drive 1A according to the second embodiment of the present invention. At this time, the contacting part 2A2 of the braking component 2A is apart from the rim of the disc 9. Please refer to FIG. 15 FIG. 19. FIG. 18 is a perspective view of relative positions of individual components of the disc braking device 8A shown in FIG. 16 when the slim type optical disc drive 1A is loading the disc 9 according to the second embodiment of the present invention. FIG. 19 is a perspective view of the slim type optical disc drive 1A comprising the disc braking device 8A when the slim type optical disc drive 1A is loading the disc 9 according to the second embodiment of the present invention. When the slim type optical disc drive 1A is loading the disc 9, the flange 3A2 of the braking rod 3A touches the raising part 19 installed on the lateral side 13b of the bottom cover 13. Hence, the braking rod 3A is driven by a pressing force caused by the flange 3A2 in a first direction (direction E) and rotates in a second direction (direction F) to drive the contacting part 2A2 of the braking component 2A to touch the rim of the disc 9 in order to force the disc 9 to stop rotating. However, once the flange 3A2 is detached from the raising part 19, the flange 3A2 flips out in a third direction (direction G) because the pressing force in the first direction (direction E) disappears. A torque force provided by the elastic component 6A drives the braking rod 3A to rotate in a fourth direction (direction H), in order to drive the contacting part 2A2 of the braking component 2A to be detached from the rim of the disc 9 until the disc 9 is totally loaded by the slim type optical disc drive 1A, as shown in FIG. 20. FIG. 20 is a perspective view of the slim type optical disc drive 1A comprising the disc braking device 8A after the slim type optical disc drive 1A has loaded the disc 9 according to the second embodiment of the present invention.

Please refer to FIG. 15–FIG. 19. The disc 9 is in the slim type optical disc drive 1A as shown in FIG. 20. Before the disc 9 is ejected from the slim type optical disc drive 1A, the flange 3A2 of the braking rod 3A touches the raising part 19 installed on the lateral side 13b of the bottom cover 13. Hence, the braking rod 3A is driven by a pressing force caused by the flange 3A2 in a first direction (direction E) and rotates in a second direction (direction F) to drive the contacting part 2A2 of the braking component 2A to touch the rim of the disc 9, in order to force the disc 9 to stop rotating. However, once the flange 3A2 is detached from the raising part 19, the flange 3A2 flips out in a third direction (direction G) because the pressing force in the first direction (direction E) disappears. A torque force provided by the elastic component 6A drives the braking rod 3A to rotate in a fourth direction (direction H), in order to drive the contacting part 2A2 of the braking component 2A to be detached from the rim of the disc 9 until the disc 9 is ejected from the slim type optical disc drive 1A, as shown in FIG. 16. The above-mentioned design ensures that the disc 9 does not move or rotate when it is being loaded by or ejected from the slim type optical disc drive 1A.

Furthermore, when the disc 9 is put on the disc tray 10 before it is loaded into the slim type optical disc drive, the disc 9 of the second embodiment can rotate freely. On the other hand, the disc 9 of the first embodiment can be kept still on the turn table 12 because the braking component 2 touches the rim of the disc 9.

As above-mentioned embodiments, each disc braking device according to the present invention can be installed on the disc tray of the optical disc drive. Therefore, when the disc is being ejected, the disc can be forced to stop rotating more efficiently and directly without being affected by variations of covering components or positions of components during manufacturing.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A disc braking device utilized in an optical disc drive, the disc braking device comprising:
   a structure portion;
   a braking rod installed on the structure portion;
   a braking component installed on the braking rod and utilized for making a disc stop rotating;
   a tappet installed on the structure portion and utilized for driving the braking rod;
   an elastic component installed on the structure portion, wherein one end of the elastic component hooks the tappet; and
   an elastic unit installed on the structure portion and utilized for driving the braking rod to force the disc to stop rotating.

2. The disc braking device of claim 1, wherein the tappet comprises a sliding slot.

3. The disc braking device of claim 2, wherein the structure portion further comprises a first guiding peg and a second guiding peg located in the sliding slot and utilized for guiding the tappet to slide.

4. The disc braking device of claim 3, wherein the structure portion further comprises a plurality of positioning pins utilized for positioning and installing the braking rod, the elastic component and the elastic unit.

5. The disc braking device of claim 1, further comprising an covering component installed on the structure portion.

6. The disc braking device of claim 5, wherein the structure portion further comprises a positioning hook utilized for positioning and hooking the covering component.

7. The disc braking device of claim 5, wherein the structure portion further comprises a positioning slot utilized for positioning and installing the covering component.

8. The disc braking device of claim 1, wherein the elastic unit is a leaf spring.

9. The disc braking device of claim 1, wherein the elastic component is a spring made of metal or plastic materials.

10. The disc braking device of claim 1, wherein the tappet comprises a positioning hook and the elastic component hooks the positioning hook of the tappet.

11. The disc braking device of claim 1, wherein when the disc is being ejected from the optical disc drive, the elastic unit drives the braking rod to rotate, in order to make the braking component touch the rim of the disc.

12. The disc braking device of claim 1, further comprising a raising part installed on a lateral side of a bottom cover of the optical disc drive.

13. A disc accessing device, comprising:
   a disc tray comprising a turn table utilized for positioning and rotating a disc for accessing the data from the disc;
   a bottom cover utilized for bearing the disc tray;
   a disc braking device installed on the disc tray and utilized for making the disc stop rotating;
   a tappet installed on the structure portion and utilized for driving the braking rod;
   an elastic component installed on the structure portion, wherein one end of the elastic component hooks the tappet; and
   an elastic unit installed on the structure portion and utilized for driving the braking rod to force the disc to stop rotating when the elastic unit is moving.

14. The disc accessing device of claim 13, wherein the tappet comprises a sliding slot.

15. The disc accessing device of claim 14, wherein the structure portion further comprises a first guiding peg and a second guiding peg located in the sliding slot and utilized for guiding the tappet to slide.

16. The disc accessing device of claim 13, wherein the disc braking device further comprises an covering component installed on the structure portion.

17. The disc accessing device of claim 16, wherein the structure portion further comprises a positioning hook utilized for positioning and hooking the covering component.

18. The disc accessing device of claim 16, wherein the structure portion further comprises a positioning slot utilized for positioning and installing the covering component.

19. The disc accessing device of claim 13, wherein the elastic unit is a leaf spring.

20. The disc accessing device of claim 13, wherein the elastic component is a spring made of metal or plastic materials.

21. The disc accessing device of claim 13, wherein the tappet comprises a positioning hook and the elastic component hooks the positioning hook of the tappet.

22. The disc accessing device of claim 13, wherein the structure portion further comprises a plurality of positioning pins utilized for positioning and installing the braking rod, the elastic component and the elastic unit.

23. The disc accessing device of claim 13, wherein when the disc is being ejected from the disc accessing device, the elastic unit drives the braking rod to rotate, in order to make the braking component touch the rim of the disc.

24. The disc accessing device of claim 13, wherein the disc braking device further comprises a raising part installed on a lateral side of a bottom cover of the disc accessing device.

* * * * *